(12) United States Patent  
Preimesberger et al.

(10) Patent No.: US 8,458,449 B2  
(45) Date of Patent: Jun. 4, 2013

(54) COMPONENT DRIVERS FOR A COMPONENT OF A DEVICE

(75) Inventors: Lee A Preimesberger, Houston, TX (US); Sangita Amit Patel, Houston, TX (US); Eric Ramirez, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 213 days.

(21) Appl. No.: 13/015,032

(22) Filed: Jan. 27, 2011

(65) Prior Publication Data

US 2012/0198219 A1 Aug. 2, 2012

(51) Int. Cl.
G06F 9/00 (2006.01)
G06F 9/24 (2006.01)
G06F 9/445 (2006.01)
G06F 15/177 (2006.01)

(52) U.S. Cl.
USPC .................................. 713/1; 713/2; 717/174

(58) Field of Classification Search
USPC ........................................................ 713/1, 2
See application file for complete search history.

(56) References Cited

U.S. PATENT DOCUMENTS

| | | | |
|---|---|---|---|
| 5,655,148 A * | 8/1997 | Richman et al. ............... 710/8 |
| 5,694,600 A * | 12/1997 | Khenson et al. ............... 713/2 |
| 5,748,980 A | 5/1998 | Lipe et al. |
| 6,567,860 B1 | 5/2003 | Maxwell et al. |
| 6,996,706 B1 * | 2/2006 | Madden et al. ............... 713/2 |
| 7,299,345 B2 * | 11/2007 | Van Cleve et al. ............ 713/2 |
| 7,882,343 B2 * | 2/2011 | Fontijn ............................ 713/2 |
| 8,171,272 B1 * | 5/2012 | Chester et al. ................. 713/1 |
| 8,291,206 B2 * | 10/2012 | Wang et al. .................... 713/1 |
| 2002/0169949 A1 * | 11/2002 | Shenassa et al. .............. 713/1 |
| 2003/0065913 A1 * | 4/2003 | Cepulis et al. ................ 713/1 |
| 2007/0061562 A1 * | 3/2007 | Zimmer et al. ................ 713/2 |
| 2007/0169116 A1 | 7/2007 | Gujarathi et al. |
| 2007/0250692 A1 * | 10/2007 | Linn ................................ 713/1 |
| 2011/0055537 A1 * | 3/2011 | Yang ............................... 713/2 |
| 2011/0131447 A1 * | 6/2011 | Prakash et al. ................ 714/19 |

OTHER PUBLICATIONS

Sun Ultra 20 M2 Workstation Operating System Installation Guide, 2007, Sun Microsystems Inc, http://docs.oracle.com/cd/E19127-01/ultra20m2.ws./ws/819-6583-12/windows.install.html.*

Using MagicISO to create multiple bootable CD/DVD image file, 2002, http://www.magiciso.com/tutorials/miso-createmultibootcd.htm.*

* cited by examiner

Primary Examiner — Mark Connolly
(74) Attorney, Agent, or Firm — Chun-Liang Kuo

(57) ABSTRACT

A device including a ready only memory to include component drivers for at least one component of the device, a controller to determine whether a bootable storage device includes at least one operating system, and an embedded application to select and load component drivers onto the device for at least one of the components before installing an operating system from the bootable storage device.

19 Claims, 7 Drawing Sheets

COMPONENT DRIVERS FOR A COMPONENT OF A DEVICE

BACKGROUND

When installing component drivers and an operating system for a device, a user can load media into a device. The media can include the operating system and component drivers associated with the operating system. The device can execute and/or load one or more files from the media onto the device when installing the operating system. Additionally, when installing the operating system, the operating system can load one or more of the component drivers from the media as part of an installation process. Once the operating system and the component drivers from the media are loaded onto the device, the device can be available for use.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

By determining whether a bootable storage device coupled to a device includes an operating system, a controller can proceed to select and load one or more component drivers from a read only memory for the components of the device to use. As a result, a user friendly experience can be created by automatically loading and/or installing component drivers which are compatible with the components of the device. Additionally, by installing an operating system which is compatible with the loaded component driers from the bootable storage device, user error can be decreased by insuring that an operating system which is loaded or installed onto the device is compatible with the loaded component drivers.

Figure 1:
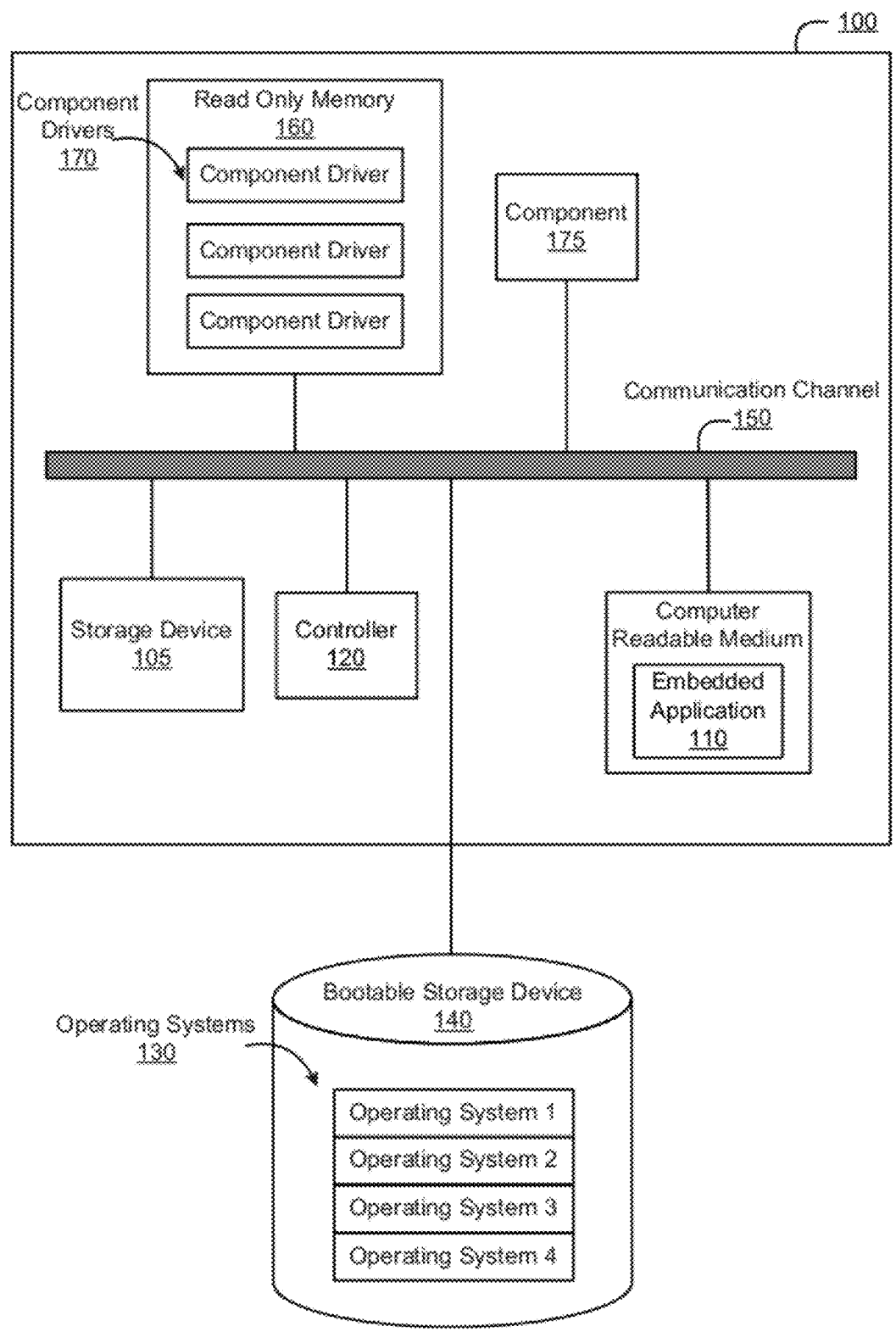
FIG. 1 illustrates a device with components drivers on read only memory of the device according to an embodiment.

FIG. 1 illustrates a device 100 with components drivers 170 included in read only memory 160 of the device 100 according to an embodiment. In one embodiment, the device 100 is or includes a desktop, a laptop, a notebook, a tablet, a netbook, an all-in-one system, a server, and/or the like. In another embodiment, the device 100 is a cellular device, a PDA, an entertainment system and/or any additional device which can include component drivers 170 on read only memory 160.

As illustrated in FIG. 1, the device 100 includes a controller 120, read only memory 160, an embedded application 110, a storage device 105, one or more components 175, and a communication channel 150. Additionally, the device 100 can be coupled to one or more bootable storage devices 140. In one embodiment, one or more of the bootable storage devices 140 can include at least one operating system 130. In other embodiments, the device 100 includes additional components and/or is coupled to additional components in addition to and/or in lieu of those noted above and illustrated in FIG. 1.

As noted above, the device 100 includes a controller 120. The controller 120 can send data and/or instructions to the components of the device 100, such as the embedded application 110, the read only memory 160, and/or one or more bootable storage devices 140 using the communication channel 150. Additionally, the controller 120 can receive data and/or instructions from components of the device 100, such as the embedded application 110, the read only memory 170, and/or one or more bootable storage devices 140 using the communication channel 150.

The embedded application 110 is an application which can be utilized in conjunction with the controller 120 to load one or more component drivers 170 from the read only memory 160 onto the device 100. For the purposes of this application, a component driver 170 can include software and/or firmware utilized by the controller 120 and/or the embedded application 110 to communicate with and/or control one or more components 175 of the device 100. One or more components 175 can be coupled to the device 100 and can include a display device, an input device, a video component, an audio component, a network interface component, and/or any additional component coupled to the device 100.

The embedded application 110 and/or the controller 120 can initially determine whether a bootable storage device 140, coupled to the device 100, includes at least one operating system 130 in response to the device 100 entering a boot phase. An operating system 130 is a software application including data, information, and/or additional applications which the controller 120 and/or the embedded application 110 can use to communicate with and/or interface with one or more components 175 of the device 100 through component drivers 170. In one embodiment, a component driver 170 can be or include a video component driver, an audio component driver, a network interface component driver, a display device component driver, and/or an input device component driver.

The device 100 can enter a boot phase in response to one or more components 175 of the device 100 powering on from a power off state. During the boot phase, the controller 120 and/or the embedded application 110 can determine whether a storage device coupled to the device 100 is bootable. For the purposes of this application, a bootable storage device 140 is a storage device which is detected by the controller 120 and/or the embedded application 110 to include media and/or a file which can be executed by the controller 120 and/or the embedded application 110 during the boot phase.

If one or more operating systems 130 are detected, the controller 120 and/or the embedded application 110 can proceed to select one or more component drivers 170 from the read only memory 160 for at least one component 175 of the device 100 that is compatible with one or more of the operating systems 130 found on a bootable storage device 140. The controller 120 and/or the embedded application 110 can then load one or more of the selected component drivers 170 onto the device 100 for use.

In one embodiment, one or more of the component drivers 170 are loaded onto the storage device 105 of the device 100.

The storage device 105 can be included in the device 100 can include one or more loaded component drivers 170. Once the component drivers 170 have been loaded onto the device 100, the controller 120 and/or the embedded application 110 can install an operating system 130 compatible with the loaded component drivers 130 onto the device 100 from a bootable storage device 140.

The embedded application 110 can be a firmware of the controller 120 and/or the device 100. In one embodiment, the embedded application 110 can be a Basic Input Output System of the device 100. In another embodiment, the embedded application 110 can be an embedded operating system stored on the device 100 within the read only memory 160 or on a computer readable medium accessible by the controller 120 and/or the device 100.

Additionally, in one embodiment, the computer readable medium is included in the device 100 or the computer readable medium is coupled to the device 100. In other embodiments, the computer readable medium is not included in the device 100, but is accessible to the device 100 utilizing a network interface component included in the device 100. The network interface component can be a wired or wireless network interface card. In other embodiments, the computer readable medium can be configured to couple to one or more ports or interfaces on the device 100 wirelessly or through a wired connection.

In a further embodiment, the embedded application 110 is stored and/or accessed through a server coupled through a local area network or a wide area network. The embedded application 110 communicates with devices and/or components coupled to the device 100 physically or wirelessly through a communication bus 150 included in or attached to the device 100. In one embodiment the communication bus 150 is a memory bus. In other embodiments, the communication bus 150 is a data bus.

Figure 2:
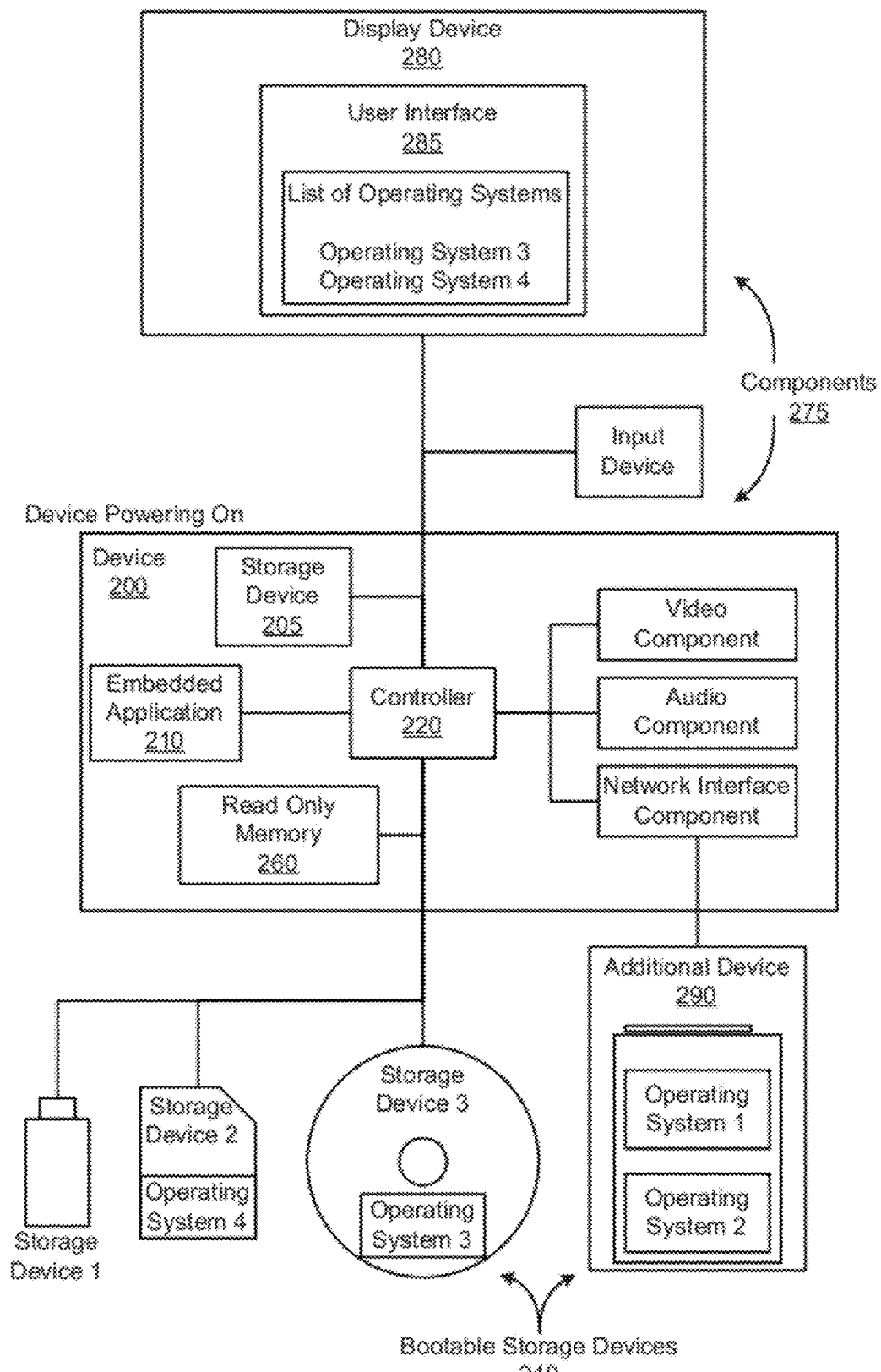
FIG. 2 illustrates a device coupled to at least one component and at least one bootable storage device according to an embodiment.

FIG. 2 illustrates a device 200 coupled to at least one component 275 and at least one bootable storage device 240 according to an embodiment. As illustrated in FIG. 2, one or more of the components 275 can be included in the device 200. In one embodiment, one or more of the components 275 can be integrated as part of the device 200. In another device, one or more of the components 275 can be coupled to the device 200. One or more of the components 275 can be physically or wireless be coupled to the device 200.

As shown in the present embodiment, the device 200 can initially power on to transition one or more components 275 of the device 200 from a power off state to a power on state. In response to the device 200 powering on, the device 200 can enter a boot phase for the controller 220 and/or the embedded application 210 to determine whether a bootable storage device 240 is coupled to the device 200.

As noted above, a bootable storage device 240 can be a storage device coupled to the device 200 which includes media and/or a file which can be executed by the controller 220 and/or the embedded application 210 during the boot phase. In one embodiment, the media and/or the file can include an auto executable file and/or a boot loader. As a result, in response to the device 200 powering on, the controller 220 and/or the embedded application 210 can determine whether any coupled storage devices include the executable media and/or file.

One or more of the storage devices can be included in the device 200 or directly coupled to the device 200 through one or more ports or interfaces of the device 200. In one embodiment, a storage device and/or a bootable storage device 240 can be or include an external storage device, an internal storage device, a compact disc, a digital versatile disc, a Blu-ray disc, a universal serial bus device, a serial device, and/or any additional device coupled to the device 200 which includes executable media and/or files.

As illustrated in FIG. 2, storage device 1, storage device 2, and storage device 3 are directly coupled to the device 200. In one embodiment, the controller 220 and/or the embedded application 210 have detected an executable media and/or file on storage device 1, storage device 2, and storage device 3. As a result, storage device 1, storage device 2 and storage device 3 are identified as bootable storage devices 240. In response to detecting the bootable storage devices 240, the controller 220 and/or the embedded application 210 proceed to determine whether the bootable storage devices 240 include one or more operating systems. As shown in the present embodiment, operating system 3 and operating system 4 are detected on storage device 2 and storage device 3 respectively.

In another embodiment, if the controller 220 and/or the embedded application 210 previously did not detect any operating system on storage device 1, storage device 2, and storage device 3, the controller 220 and/or the embedded application can proceed to detect whether any storage device or additional device is coupled to a network interface component of the device 200. If the controller 220 and/or the embedded application 210 detect an additional device 290 coupled to a network interface component of the device 200, the controller 220 and/or the embedded application can proceed to determine whether the additional device 290 and/or the storage device of the additional device 290 includes an operating system. If an operating system is detected, the additional device 290 and/or the storage device can be identified as a bootable network storage device.

In response to detecting at least one operating system on the bootable storage devices 240, the controller 220 and/or the embedded application 210 can proceed to select and load component drivers for one or more components 275 of the device 200 from a read only memory 260 of the device 200. As noted above, one or more of the component drivers can be loaded onto a storage device 205 included in the device 200. In one embodiment, the storage device 205 can be or include random access memory, a flash memory, a solid state device, and/or any additional device configured to store one or more loaded component drivers.

As illustrated in the present embodiment, one or more of the components 275 can be coupled to the device 200 and can include a display device 280, an input device, a video component, an audio component, a network interface component, and/or any additional component coupled to the device 200 in addition to and/or in lieu of those noted above and illustrated in FIG. 2. In one embodiment, the display device 280 can be configured by the controller 220 and/or the embedded application 210 to render a user interface 285 for a user of the device 200 to interact with.

The display device 280 can be an analog or a digital device configured to render, display, and/or project a user interface 285 as one or more text, pictures, and/or moving videos. In one embodiment, the display device 280 can be a LCD (liquid crystal display), a LED (light emitting diode) display, a CRT (cathode ray tube) display, a plasma display, a projector and/or any additional device configured to render a user interface 285. The user interface 285 can be rendered to include text, images, and/or videos.

In one embodiment, the user interface 285 can list one or more operating systems detected on the bootable storage devices 240. As a result, the user interface 285 lists operating system 3 and operating system 4 to be available to be installed. In one embodiment, the user interface 285 can additionally display a message, prompting the user to select one or more of the available operating systems to install onto the device 200. The user can access the input device when selecting one or more of the available operating systems to install.

Figure 3:
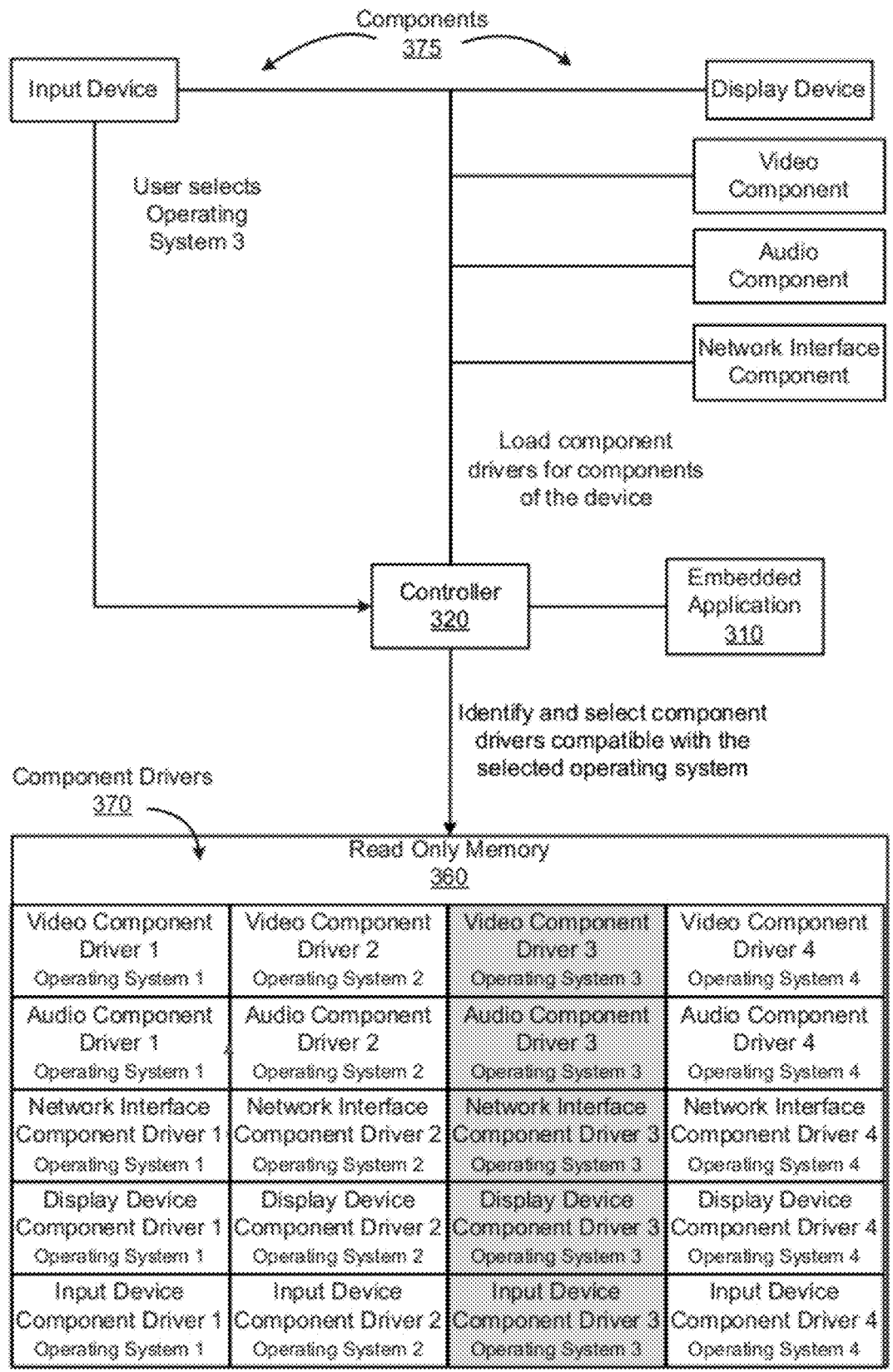
FIG. 3 illustrates a block diagram of component drivers being loaded for at least one component of a device according to an embodiment.

FIG. 3 illustrates a block diagram of component drivers 370 being loaded for at least one component 375 of a device according to an embodiment. As noted above, the component drivers 370 can include software and/or firmware which can be utilized by the controller 320 and/or the embedded application 310 to communicate with and/or control one or more components 375 of the device. In one embodiment, the component drivers 370 can additionally be used by the controller 320 and/or the embedded application 310 to log data of a corresponding component 375 and/or the device.

As illustrated in FIG. 3, the component drivers 370 can be stored and accessed by the controller 320 and/or the embedded application from a read only memory 360 of the device. In one embodiment, the component drivers 370 included in the read only memory 360 cannot be modified and/or deleted. The read only memory 360 can include a mask ROM, an erasable programmable read only memory (EPROM), a flash electronically erasable programmable read only memory (EEPROM), and/or any additional solid state memory.

In one embodiment, each of the component drivers 370 in the read only memory 360 can correspond to a component 375 of the device. In another embodiment, the read only memory 360 can include more than one component driver 370 for each corresponding component 375 of the device. As illustrated in the present embodiment, the read only memory 360 can include a set of component drivers for the video component, the audio component, the network interface component, the display device component, and the input device component. Each of the component drivers 370, in a set of drivers for each component 375, can list which operating system the corresponding component driver 370 is compatible with. The listed operating system can be included in a file name of the corresponding component driver or as part of its metadata.

When determining which of the component drivers 370 to install onto the device from the read only memory 360, the controller 320 and/or the embedded application 310 can detect whether a user has selected an operating system to install. If no operating system is selected, the controller 320 and/or the embedded application 310 can proceed to install all of the component drivers 370 from the read only memory 360. In another embodiment, as illustrated in FIG. 3, an input device has detected that the user has selected for operating system 3 to be installed onto the device.

In response, the controller 320 and/or the embedded application 310 can proceed to identify and select component drivers 370 compatible with operating system 3. As illustrated in FIG. 3, the controller 320 and/or the embedded application 310 identify that the metadata of video component driver 3, audio component driver 3, network interface component driver 3, display device component driver 3, and input device component driver 3 indicate that they are compatible with operating system 3. As a result, the controller 320 and/or the embedded application 310 proceed to select and load the component drivers 370 identified to be compatible with operating system 3 onto the device.

In one embodiment, when loading the selected component drivers 370 onto the device, the controller 320 and/or the embedded application 310 can retrieve the selected component drivers 370 from the read only memory 360 and proceed to load them into a storage device included in the device. In another embodiment, when loading the selected component drivers 370, the controller 320 and/or the embedded application 310 can extract, decompress, and/or un-package the selected component drivers 370 onto the storage device.

Figure 4:
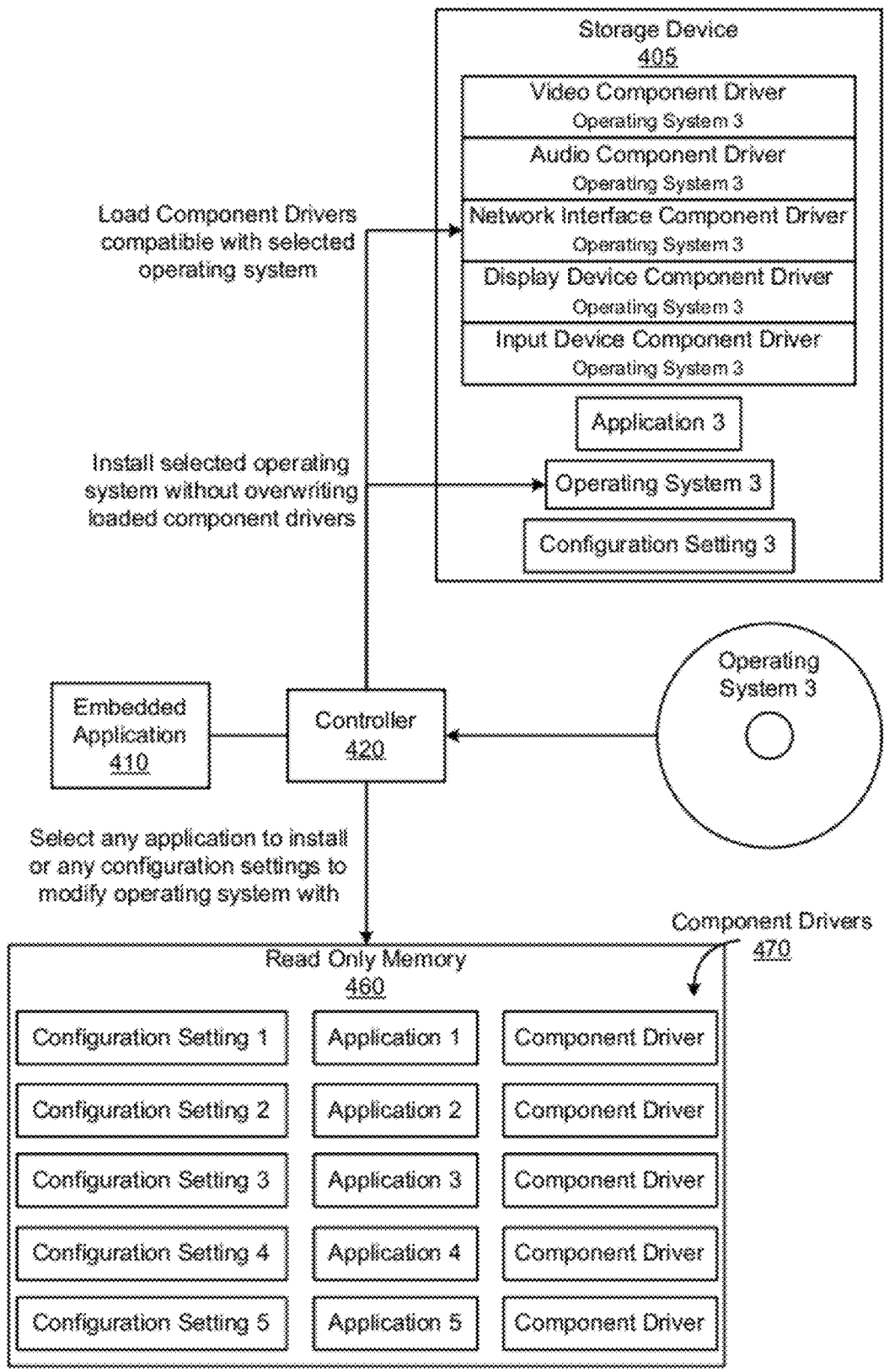
FIG. 4 illustrates a block diagram of an operating system being loaded onto a device according to an embodiment.

FIG. 4 illustrates a block diagram of an operating system being loaded onto a device according to an embodiment. As noted above, operating system 3 was previously selected by a user to install onto the device. In response, as illustrated in FIG. 4, the controller 420 and/or the embedded application 410 proceed to load component drivers 470 compatible with operating system 3 onto a storage device 405 of the device before loading and/or installing the selected operating system 3.

Once the compatible component drivers have been loaded onto the device, the controller 420 and/or the embedded application 410 proceed to install the selected operating system 3 from the bootable storage device. During the installation process of operating system 3, the controller 420 and/or the embedded application 410 will not overwrite the component drivers 470 which were previously loaded onto the storage device 405. If the operating system attempts to overwrite the loaded component drivers 470, the controller 420 and/or the embedded application 410 can block access to the loaded component drivers 470. In another embodiment, the controller 420 and/or the embedded application 410 can instruct the selected operating system 3 to skip installation of any component drivers.

Additionally, as illustrated in FIG. 4, the read only memory 460 can additionally include one or more configuration settings and/or one or more applications. For the purposes of this application, a configuration setting can include a file and/or metadata which can be used to configure data and/or settings of the selected operating system during the installation process. Additionally, an application can be an application, widget, plug-in, and/or any additional software application which can be installed for use with the selected operating system.

As shown in the present embodiment, the read only memory 460 can include multiple configuration settings and/or multiple applications. Each of the configuration settings and each of the applications can be compatible and be used with a specific operating system. As a result, when selecting any configuration setting to configure operating system 3 with or when selecting any application to load onto operating system 3, the controller 420 and/or the embedded application 410 can identify a configuration setting and/or an application compatible with operating system 3.

As illustrated in FIG. 4, the controller 420 and/or the embedded application 410 determine that configuration setting 3 and application 3 are compatible with operating system 3. As a result, the controller 420 and/or the embedded application 410 retrieve configuration setting 3 to modify one or more settings of operating system 3 during installation. Once operating system 3 has been installed and configured, the controller 420 and/or the embedded application 410 proceed to install application 3 onto device.

In response to installing the selected operating system 3 without overwriting the previously loaded component drivers 470, a user, a manufacturer, and/or or distributor of the device can create a user friendly installation experience for the user. Additionally, the user, manufacturer and/or distributor can insure that stable and compatible component drivers are loaded and used with a compatible operating system.

Figure 5:
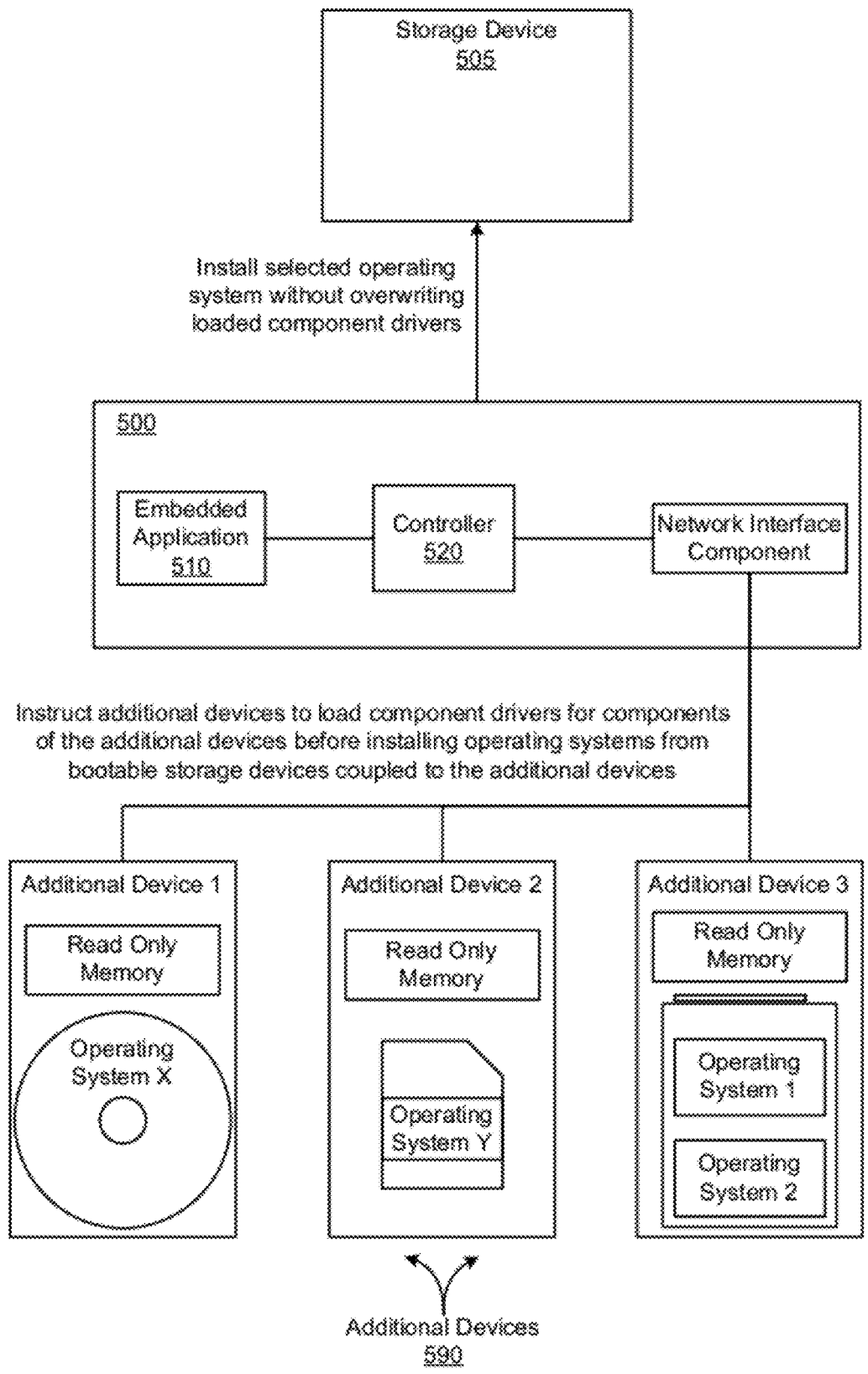
FIG. 5 illustrates a block diagram of an operating system being loaded onto a device and the device communicating with at least one additional device according to an embodiment.

FIG. 5 illustrates a block diagram of a device coupled and communicating with at least one additional device according to an embodiment. As noted above and as illustrated in FIG. 5, the device 500 can be coupled to one or more additional devices (Additional Device 1, Additional Device 2, and Additional Device 3) through a network interface component. This feature can be utilized by a user if the user wishes to setup multiple devices by loading corresponding component drivers for the corresponding devices and installing a compatible operating system on the additional devices.

In one embodiment, the controller 520 and/or the embedded application 510 can send a signal and/or instruction for one or more of the additional devices to load component drivers for corresponding components of the additional devices before installing operating systems. The component drivers can be stored on corresponding read only memory of the additional devices. Additionally, one or more of the operating systems can be stored on bootable storage devices coupled to the additional devices.

The controller 520 and/or the embedded application 510 can send the additional devices instructions and/or signals while an operating system is being loaded and/or installed onto the device 500. In another embodiment, if the controller 520 and/or the embedded application 510 previously did not detect any coupled bootable storage device to include an operating system, before or while sending the signal or instruction, the controller 520 and/or the embedded application 510 can identify one or more of the additional devices as bootable storage devices.

Additionally, the controller 520 and/or the embedded application 510 can access corresponding read only memory from one or more of the additional devices and load one or more components drivers from the additional devices. The controller 520 and/or the embedded application can then select and/or load an operating system from one or more of the additional devices onto the device 500.

In response to receiving the signal or instruction, Additional Device 1, Additional Device 2 and Additional Device 3 can proceed to load component drivers from corresponding read only memories onto Additional Device 1, Additional Device 2, and Additional Device 3 before loading or installing operating system X, Operating System Y, Operating System 1, and/or Operating System 2. By instructing the additional devices to repeat the methods disclosed above for the device 500, time can be saved and stability can be improved when setting up the additional devices by loading component drivers onto corresponding components before installing compatible operating systems for the corresponding devices.

Figure 6:
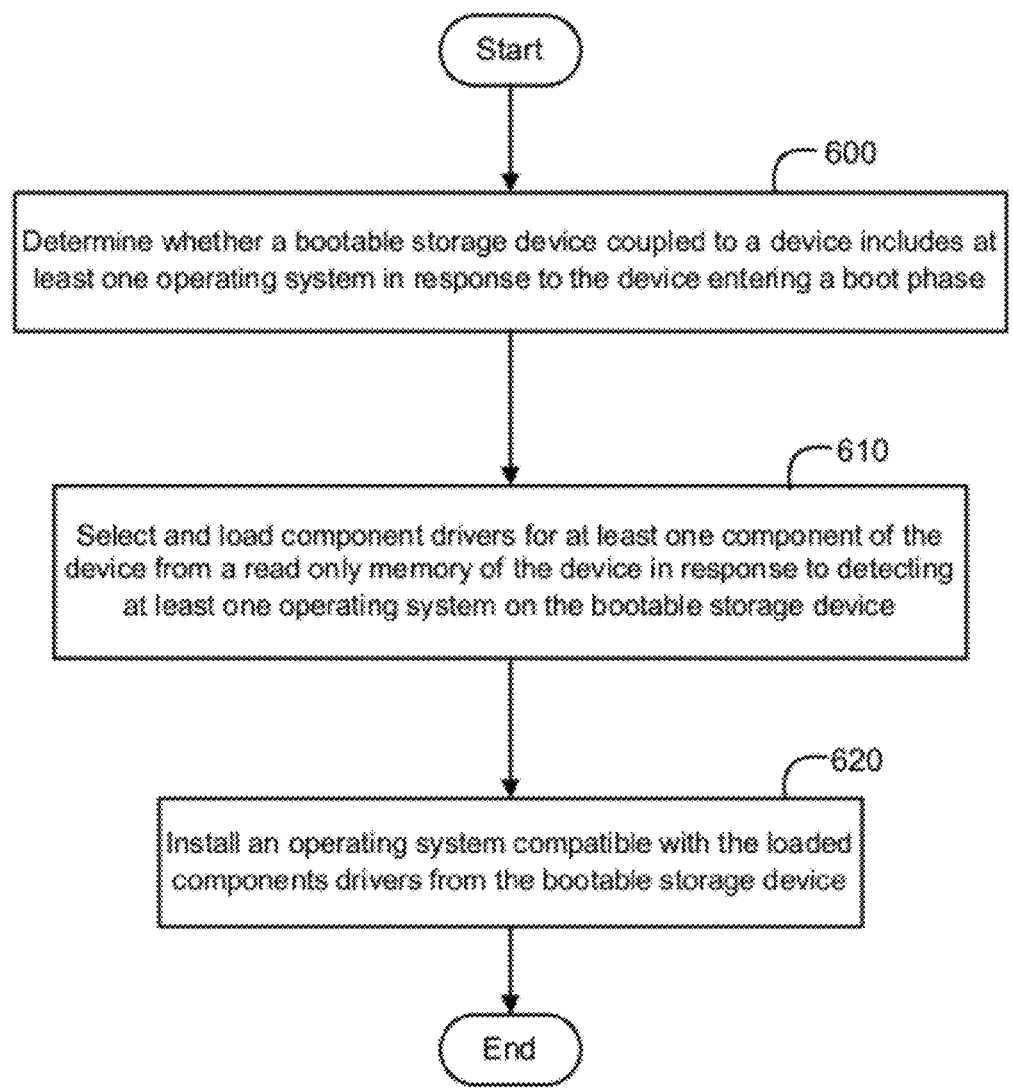
FIG. 6 is a flow chart illustrating a method for loading a component driver according to an embodiment.

FIG. 6 is a flow chart illustrating a method for loading a component driver according to an embodiment. The method of FIG. 6 uses a device with a controller, read only memory, one or more component drivers, a communication port, a communication channel, and/or an embedded application. In other embodiments, the method of FIG. 6 uses additional components and/or devices in addition to and/or in lieu of those noted above and illustrated in FIGS. 1, 2, 3, 4, and 5.

As noted above, the embedded application is an application which can be used in conjunction with the controller to load one or more component drivers for components of the device from the read only memory onto the device. In one embodiment, the embedded application can be BIOS or an embedded operating system of the device. As noted above, the components can include a display device, a video component, an audio component, an input component, a network interface component, and/or any additional device or component coupled to the device.

The controller and/or the embedded application can initially determine whether a bootable storage device, coupled to the device, includes at least one operating system in response to the device entering a boot phase 600. As noted above, the device enters a boot phase in response to one or more components of the device powering on. Additionally, a bootable storage device includes a storage device which includes media and/or a file which can be executed by the controller and/or the embedded application during the boot phase.

The controller and/or the embedded application can access one or more storage devices coupled to a port or an interface of the device and proceed to determine whether the corresponding storage devices include executable media and/or files. If any executable media and/or file is detected, the corresponding storage device can be identified as bootable storage device. In response to identifying one or more bootable storage devices, the controller and/or the embedded application can proceed to detect whether the bootable storage devices include one or more operating systems.

As noted above, an operating system is an application including data, information, and/or applications which can be run on the device. If any operating system is detected on a bootable storage device, the controller and/or the embedded application can proceed to access one or more component drivers included in a read only memory of the device. The read only memory can include solid state memory and can be directly coupled to the device.

Additionally, the component drivers can include firmware and/or software which can be utilized by the controller, the embedded application, and/or a loaded operating system to control and/or communicate with components of the device. In one embodiment, each of the component drivers can correspond to a component of the device. In another embodiment, multiple component drivers can exist for a component of the device. Each of the components drivers corresponding to a component can correspond to a specific operating system.

In response to accessing one or more of the component drivers, the controller and/or the embedded application can proceed to select and load component drivers for at least one component of the device from the read only memory of the device 610. As noted above, when loading the component drivers, the controller and/or the embedded application can load the selected components drivers onto a storage device of the device.

In one embodiment, the controller and/or the embedded application can select load all of the component drivers included in the read only memory. In another embodiment, if a user previously selected a specific operating system to install for the device, the controller and/or the embedded application can identify component drivers compatible with the selected operating system by reading files names or metadata of the components drivers. The metadata can include a header file. Once the compatible component drivers have been identified and selected, they can be loaded onto the device. In response to loading one or more component drivers onto the device, the controller and/or the embedded application can proceed to install an operating system compatible with the loaded component drivers onto the device from the bootable storage device 620.

In one embodiment, the controller and/or the embedded application can additionally select one or more configuration settings and/or applications from the read only memory. Using a selected configuration setting, the controller and/or the embedded application can configure the operating system during the installation process. The controller and/or the embedded application can additionally load one or more selected applications for use on the device. The method is then complete. In other embodiments, the method of FIG. 6 includes additional steps in addition to and/or in lieu of those depicted in FIG. 6.

Figure 7:
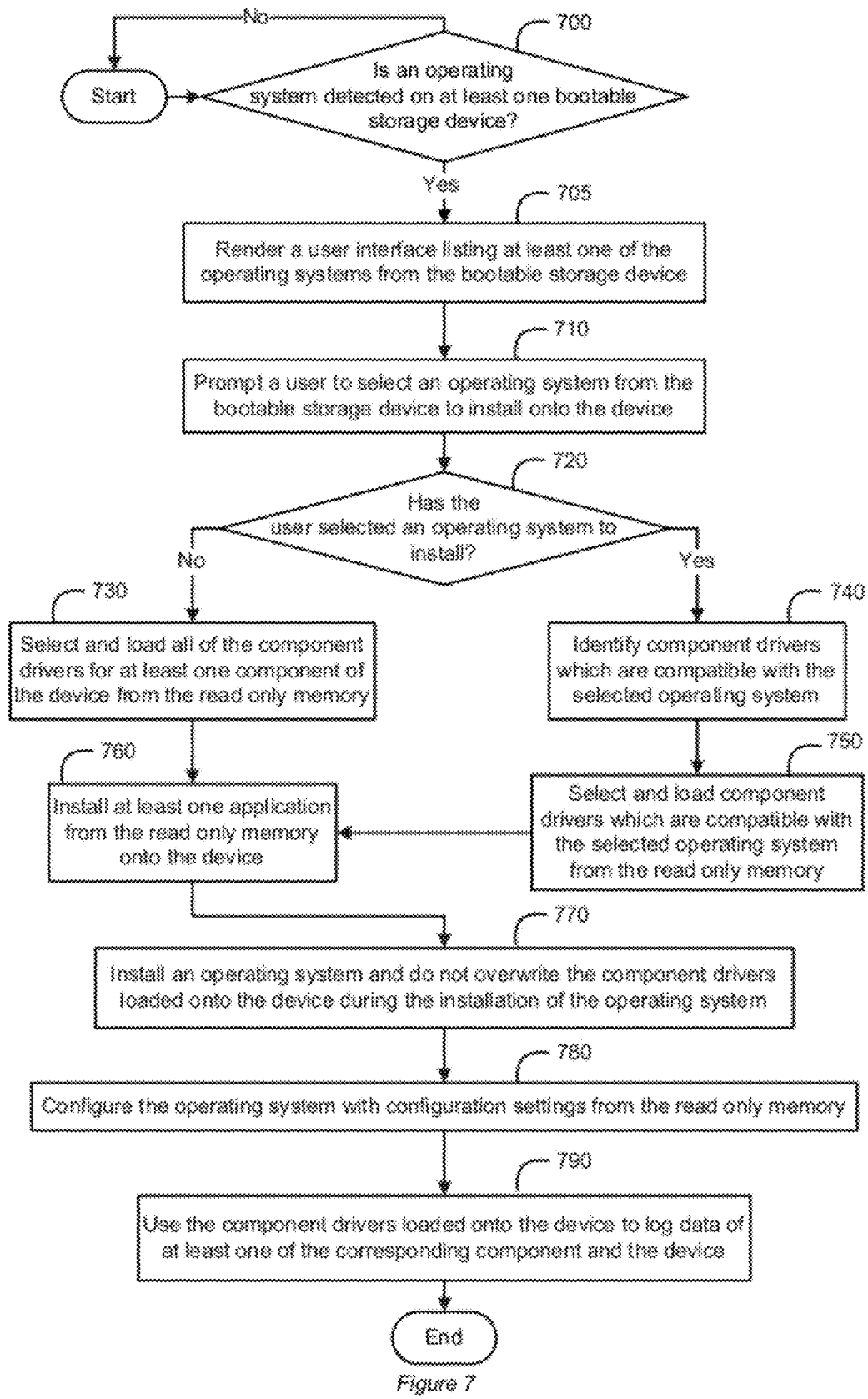
FIG. 7 is a flow chart illustrating a method for loading a component driver according to another embodiment.

FIG. 7 is a flow chart illustrating a method for loading a component driver according to another embodiment. Similar to above, the method of FIG. 7 uses a device with a controller, read only memory, one or more component drivers, a communication port, a communication channel, and/or an embedded application. In other embodiments, the method of FIG. 7 uses additional components and/or devices in addition to and/or in lieu of those noted above and illustrated in FIGS. 1, 2, 3, 4, and 5.

As noted above, the controller and/or the embedded application can initially determine whether an operating system is detected on one or more bootable storage devices coupled to the device in response to the device entering a boot phase 700. The controller and/or the embedded application can initially determine detect whether any storage devices directly coupled to the device are bootable and whether they include any operating systems. If not operating system is detected on a bootable storage device, the controller and/or the embedded application can continue detecting for another storage device coupling to the device and determine whether it includes an operating system.

In another embodiment, the controller and/or the embedded application can determine whether an additional device is coupled to a network interface of the device. If an additional device is coupled, the controller and/or the embedded application can determine whether the additional device includes an operating system or whether a bootable storage device of the additional device includes an operating system. If an operating system is detected, the additional device and/or the bootable storage device can be identified to be a network bootable storage device.

In response to detected one or more operating systems, the controller and/or the embedded application can configure a display device to render a user interface listing the detected operating systems from the bootable storage devices 705. Additionally, the user interface can render a message prompting the user to select one or more operating systems from the bootable storage devices to install onto the device 710.

The controller and/or the embedded application can then use an input device to detect whether a user has selected an operating system to install 720. In one embodiment, if no operating system is selected, the controller and/or the embedded application can proceed to select and load all of the component drivers for at least one component of the device from the read only memory 730.

In other embodiments, if a user previously selected an operating system from the user interface to install, the controller and/or the embedded application can proceed to identify component drivers from the read only memory which are compatible with the selected operating system 740. As noted above, a component driver can specify an operating system which the corresponding component driver is compatible with by listing the operating name in the file name of the corresponding component driver or in metadata of the corresponding component driver.

Once the controller and/or the embedded application have identified the component drivers which are compatible with the selected operating system, the controller and/or the embedded application can proceed to select and load the compatible component drivers onto a storage device of the device 750. In one embodiment, when loading a component driver onto the storage device, the component driver can be decompress, extracted, and/or unpackaged onto the storage device.

As noted above, the read only memory can additionally include one or more application and/or one or more configuration settings. Once the component drivers have been installed onto the device, the controller and/or the embedded application can install at least one application from the read only memory onto the device 760. The controller and/or the embedded application can then load and/or install an operating system from a bootable storage device onto the device. As noted above, when installing the operating system, the component drivers which were previously loaded onto the device are not overwritten. The controller and/or the embedded application can restrict access to the loaded component drivers and/or instruct the operating system to skip installing any component drivers.

As noted above, the controller and/or the embedded application can use configuration settings from the read only memory to modify and/or configure one or more settings on the operating system 780. In one embodiment, the controller and/or the embedded application can modify and/or configure or more settings while the operating system is being installed. In another embodiment, the modification and/or the configuration can be performed after the operating system is installed.

Using the loaded component drivers and/or the loaded applications, the controller and/or the embedded application can log information and/or data of at least one corresponding components and/or from the device 790. In another embodiment, the component drivers and/or a loaded application can be used to manage and/or provide security to the component drivers and/or the device. The method is then complete. In other embodiments, the method of FIG. 7 includes additional steps in addition to and/or in lieu of those depicted in FIG. 7.

What is claimed is:

1. A method for loading a component driver comprising:
   determining whether a bootable storage device coupled to a device includes at least one operating system in response to the device entering a boot phase;
   selecting and loading component drivers for at least one component of the device from a read only memory of the device in response to detecting at least one operating system on the bootable storage device;
   installing an operating system compatible with the loaded components drivers from the bootable storage device; and
   installing at least one application compatible with the operating system from the read only memory onto the device.

2. The method for loading a component driver of claim wherein all of the component drivers included in the read only memory are loaded onto the device.

3. The method for loading a component driver of claim 1 further comprising prompting a user to select an operating system to install onto the device in response to detecting at least one of the operating system on the bootable storage device.

4. The method for loading a component driver of claim 3 further comprising identifying component drivers which are compatible with a selected operating system and loading compatible component drivers onto the device before installing the selected operating system.

5. The method for loading a component driver of claim 1 wherein the component drivers loaded onto the device are not overwritten during the installation of the operating system.

6. The method for loading a component driver of claim 1 further comprising restricting the operating system from accessing the loaded component drivers during the installation process.

7. A device comprising:
   a ready only memory to include component drivers for at least one component of the device;
   a controller to determine whether a bootable storage device coupled to the device includes at least one operating system in response to the device entering a boot state; and an embedded application executable by the controller to select and load component drivers onto a storage device of the device for at least one of the components before installing an operating system from the bootable storage device;

wherein the embedded application installs at least one application compatible with the operating system from the read only memory onto the device.

8. The device of claim 7 wherein the bootable storage device includes at least one of a network storage device, an external storage device, a compact disc, a digital versatile disc, a Blu-ray disc, and a universal serial bus device.

9. The device of claim 7 further comprising a display device to render a user interface that lists at least one of the operating system from the bootable storage device in response to the controller detecting at least one of the operating system on the bootable storage device.

10. The device of claim 9 further comprising an input device to detect the user selecting at least one of the operating system from the bootable storage device to install onto the device.

11. The device of claim 7 wherein the embedded application includes at least one of a basic input output system and an embedded operating system of the device.

12. The device of claim 7 wherein the boot state includes the device detecting at least one of an executable file and executable media on any bootable storage device coupled to the device.

13. The device of claim 7 further comprising a network interface component to couple the device to at least one additional device.

14. The device of claim 13 wherein the controller instructs at least one of the additional devices coupled to the device to determine whether a bootable storage device coupled to the corresponding additional device includes at least one operating system and load component drivers for components of the corresponding additional devices before installing an operating system onto the corresponding additional device.

15. The device of claim 13 wherein the controller determines whether an additional device coupled to the device includes an operating system and identifies the additional device as a bootable storage device if no operating system is detected on the bootable storage device.

16. The device of claim 15 wherein the controller loads component drivers compatible with the operating system from the additional device if no operating system is detected on the bootable storage device.

17. A non-transitory computer readable medium comprising instructions that if executed cause a controller to:
determine whether a bootable storage device includes at least one operating system in response to a device entering a boot phase;
select and load component drivers for at least one component of the device from a read only memory of the device in response to the controller detecting at least one operating system on the bootable storage device;
install an operating system compatible with the loaded components drivers from the bootable storage device; and
install at least one application compatible with the operating system from the read only memory onto the device.

18. The non-transitory computer readable medium comprising instructions of claim 17 wherein the controller configures the operating system with a configuration setting from the read only memory when installing the operating system.

19. The non-transitory computer readable medium comprising instructions of claim 17 wherein the controller uses the component drivers loaded onto the device to log data of at least one of the corresponding component and the device.

* * * * *

UNITED STATES PATENT AND TRADEMARK OFFICE
CERTIFICATE OF CORRECTION

PATENT NO. : 8,458,449 B2
APPLICATION NO. : 13/015032
DATED : June 4, 2013
INVENTOR(S) : Lee A Preimesberger et al.

It is certified that error appears in the above-identified patent and that said Letters Patent is hereby corrected as shown below:

In the Claims

In column 10, line 41, in Claim 2, delete "claim" and insert -- claim 1 --, therefor.

In column 10, line 62, in Claim 7, delete "ready" and insert -- read --, therefor.

Signed and Sealed this
First Day of October, 2013

Teresa Stanek Rea
*Deputy Director of the United States Patent and Trademark Office*